(12) United States Patent
Lepert et al.

(10) Patent No.: US 6,346,739 B1
(45) Date of Patent: Feb. 12, 2002

(54) STATIC CHARGE DISSIPATION PADS FOR SENSORS

(75) Inventors: Arnaud Yves Lepert, Lafayette; Frederic Denis Raynal, Berkeley, both of CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/223,706

(22) Filed: Dec. 30, 1998

(51) Int. Cl.[7] .......................... H01L 29/00; H01L 29/76; G06K 9/00
(52) U.S. Cl. .................. 257/532; 257/632; 382/124
(58) Field of Search .................. 257/340, 532, 257/409, 487, 488, 632; 178/18.01, 18.06, 18.08; 341/15, 33; 382/124; 307/116; 324/661, 662, 671

(56) References Cited

U.S. PATENT DOCUMENTS

| | | | |
|---|---|---|---|
| 3,921,167 A | * 11/1975 | Fox | 307/116 |
| 3,974,332 A | * 8/1976 | Abe et al. | 178/18.08 |
| 4,194,083 A | * 3/1980 | Abe et al. | 178/18.06 |
| 4,290,052 A | * 9/1981 | Eichelberger et al. | 341/33 |
| 4,353,056 A | 10/1982 | Tsikos | 340/146 |
| 4,394,773 A | 7/1983 | Ruell | 382/4 |
| 4,766,474 A | * 8/1988 | Nakagawa et al. | 257/409 |
| 5,325,442 A | 6/1994 | Knapp | 382/4 |
| 5,331,580 A | 7/1994 | Miller et al. | 364/708.1 |
| 5,463,388 A | 10/1995 | Boie et al. | 341/33 |
| 5,514,612 A | 5/1996 | Rao et al. | 438/382 |
| 5,648,642 A | 7/1997 | Miller et al. | 178/18 |
| 5,778,089 A | 7/1998 | Borza | 382/124 |
| 5,847,690 A | 12/1998 | Boie et al. | 345/104 |
| 5,862,248 A | 1/1999 | Salatino et al. | 382/124 |
| 5,907,627 A | * 5/1999 | Borza | 382/124 |
| 5,978,496 A | * 11/1999 | Harkin | 382/124 |
| 6,008,081 A | 12/1999 | Wu | 438/210 |
| 6,091,082 A | 7/2000 | Thomas et al. | 257/77 |
| 6,114,862 A | * 9/2000 | Tartagni et al. | 324/662 |
| 6,163,313 A | 12/2000 | Aroyan et al. | 345/173 |
| 6,180,989 B1 | 1/2001 | Bryant et al. | 257/414 |

FOREIGN PATENT DOCUMENTS

| | | | |
|---|---|---|---|
| EP | 0 790 479 A1 | 8/1997 | G01B/7/00 |
| JP | 404/025200 A | 1/1993 | |
| WO | WO 94/05042 | 3/1994 | H01L/27/02 |
| WO | WO 98/52147 | 11/1998 | G06K/9/20 |

OTHER PUBLICATIONS

Marco Tartagni and Roberto Guerrieri, A Fingerprint Sensor Based on the Feedback Capacitive Sensing Scheme, Jan. 1998, IEEE Journal of Solid State Circuits, vol. 33, No. 1, pp. 133–142.

Tartagni, et al., "A 390 dpi Live Fingerprint Imager Based on Feedback Capacitive Sensing Scheme", 1997 IEEE International Solid–State Circuits Conference, 1997.

R.F. Wolffenbuttel and P.O.L. Regtien, "Integrated Tactile Imager with an Intrinsic Contour Detection Option", *Sensor and Actuators*, Jan./Feb. 1989, No. ½, pp. 141–153.

N.D. Young, et al., "Novel Fingerprint Scanning Arrays Using Polysilicon TFT's of Glass and Polymer Substrates", IEEE Electron Device Letters, V. 18, No. 1, Jan., 1997, pp. 19–20.

* cited by examiner

*Primary Examiner*—Steven Loke
*Assistant Examiner*—Shouxiang Hu
(74) *Attorney, Agent, or Firm*—Lisa K. Jorgenson; Daniel E. Venglarik

(57) ABSTRACT

A structure and method for dissipating charges comprising an underlying dielectric layer disposed over capacitor plates of sensor circuitry, and a conductive path and passivation layers disposed over the underlying dielectric layer wherein the conductive pad forms an electrically conductive path over at least a portion of the plates and diffuses electrostatic charges at the surface of the integrated circuit.

20 Claims, 3 Drawing Sheets

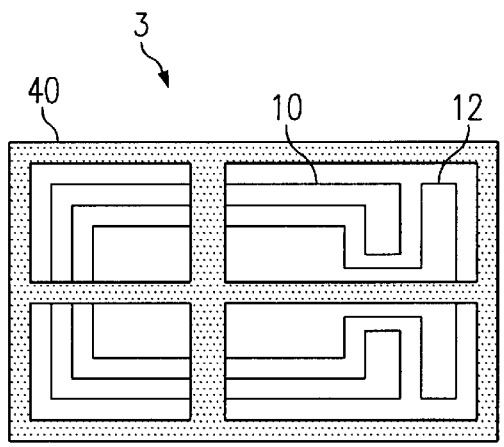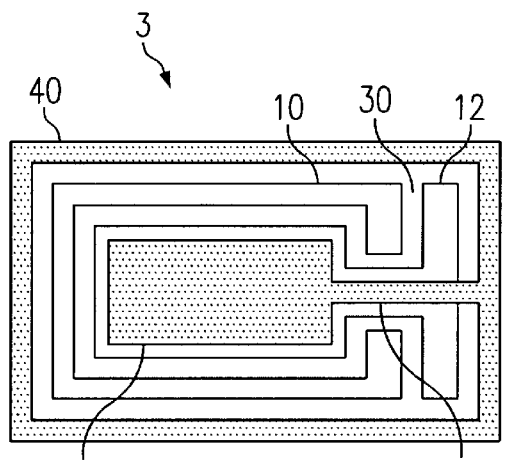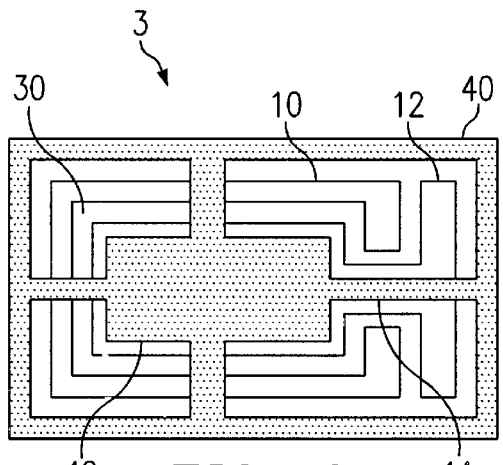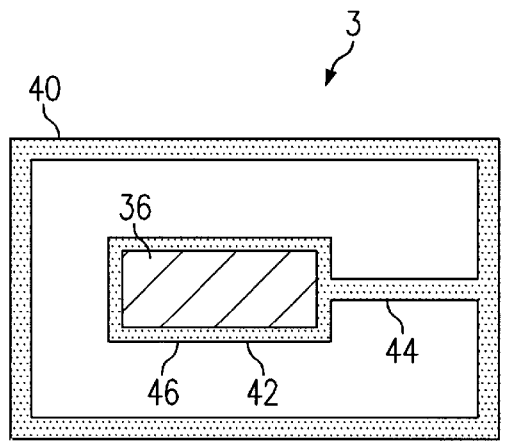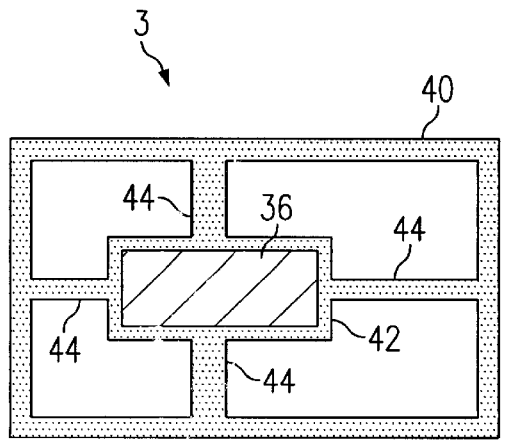

STATIC CHARGE DISSIPATION PADS FOR SENSORS

CROSS REFERENCE TO A RELATED APPLICATION

"The following related patent application, each showing a type of electrostatic discharge protection method and apparatus, are incorporated herein by reference and with which the present invention fined utility: U.S. patent application Ser. No. 08/927,450, filed Sep. 11, 1997 and titled ELECTROSTATIC DISCHARGE PROTECTION OF A CAPACITIVE TYPE FINGERPRINT SENSING ARRAY; U.S. patent application Ser. No. 09/144,182, filed Aug. 31, 1998, and titled SELECTIVELY DOPED ELECTROSTATIC DISCHARGE LAYER FOR AN INTEGRATED CIRCUIT SENSOR; U.S. patent application Ser. No. 09/224,812, filed Dec. 30, 1998, and titled STATIC CHARGE DISSIPATION FOR AN ACTIVE CIRCUIT SURFACE; U.S. patent application Ser. No. 09/223,346, filed Dec. 30, 1998, and titled APPARATUS AND METHOD FOR CONTACTING A SENSOR CONDUCTIVE LAYER; U.S. patent application Ser. No. 09/224,815, filed Dec. 30, 1998, and titled APPARATUS AND METHOD FOR CONTACTING A CONDUCTIVE LAYER; U.S. patent application Ser. No. 09/223,707, filed Dec. 30, 1998, and titled TOPOGRAPHICAL ELECTROSTATIC PROTECTION GRID FOR SENSORS; and U.S. patent application Ser. No. 09/223,629, filed Dec. 30, 1998, and titled ELECTROSTATIC DISCHARGE PROTECTION FOR SENSORS."

TECHNICAL FIELD OF THE INVENTION

The present invention relates in general to the field of static discharge dissipation, and more particularly, to a structure and method for dissipating electrostatic discharges about the surface of a sensor.

BACKGROUND

Without limiting the scope of the invention, its background is described in connection with the protection of integrated circuit fingerprint sensors from objects that may cause electrostatic discharges at or about a sensor surface, as an example.

Heretofore, in this field, the detection of fingerprint patterns, composed of lines or ridges and valleys, has been useful for the identification of specific individuals based on the observation that each individual person has a unique fingerprint. Fingerprints, therefore, can be used not only to positively identify individuals, but to exclude individuals whose fingerprint profile does not match a pre-existing set of patterns.

Fingerprint sensing has evolved from optical and mechanical sensing technologies that acquire a fingerprint image. In those systems, generally, the mechanical and optical sensors obtain a fingerprint image using a scanner or a camera, process the acquired information into an analog or digital signal that may be analyzed, and provide an output based on the acquired signal. Unfortunately, the lighting and contrast conditions available at the time the image is acquired affects the analysis of the acquired data and consequently affects the sensor output. Furthermore, image capture systems are easily tricked using a false images. In addition, conventional optical sensors usually require bulky optics, making these types of sensors impractical for portable systems.

Another class of fingerprint sensors are capacitive sensors, such as that disclosed in U.S. Pat. No. 4,353,056 issued to Tsikos. The Tsikos patent demonstrates the use of a sensor that incorporates a sensing member that has a sensing surface for receiving a fingerprint. The sensing surface has a means for sensing the ridges and valleys of the skin of the finger under observation. The sensing member contains a multitude of capacitors that sense the patterns of the fingerprint when the finger is pressed against the sensing surface. The information obtained is transformed into an electric signal. The capacitors are insulated from the environment of use by a flexible membrane that conforms itself to the contour of the fingerprint. Unfortunately, the repeated cycles of flexing and compression of the flexible membrane can lead to device failure and the need to replace the membrane.

U.S. Pat. No. 4,385,831 issued to Ruell, et al., discloses a fingerprint sensor that provides an electrical output signal in response to the topography of the fingerprint. The sensor incorporates a contact body that is formed, at least in part, by a light transparent elastic material. The elastic contact material may be attached to a flat sensor plate that has a light receiving surface. The sensor also incorporates a light source and a photodetector to measure the valleys and ridges of the fingerprint. The elastic nature of the contact body causes cycles of compression and flexing that again lead to the deterioration of the contact point between the sensor and the finger.

It has also been found that the current methods and structures for protecting sensors from the environment of intended use fail to address the distinct environmental exposures to which the sensors are exposed, in particular, electrostatic build-up on, e.g., human skin or any other object that may come into close proximity with or contact the sensor. Sensor protection versus sensitivity must generally be carefully balanced to achieve both an acceptable signal-to-noise ratio and adequate protection. Generally, as sensor protection increases, sensor sensitivity decreases. In the case of electrical damage to sensor surface structures or the active circuits that form part of the sensor circuitry during use, present electrostatic discharge circuitry fails to protect the sensor circuitry during an electrostatic discharge.

As sensors, and users, may be exposed to a wide variety of environmental conditions that can cause a great increase in electrical potential in comparison to objects that are at a different potential or grounded, it has been found that sensors should be fitted with electrostatic discharge protection to be durable. For example, when the user approaches the sensor at a great voltage disparity, a sudden electrical discharge may cause operational failure of the sensor, such failure may be temporary or permanent.

Typical electrostatic discharge protection circuits for solid state arrays may be relatively poor, since in this type of circuit configuration it is usual to connect the cell's buried and ungrounded capacitor plates to transistor gates and/or to connect the cell's ungrounded and buried capacitor plates to system ground potential by way of reverse biased diodes. In this type of construction and arrangement, the electrostatic charge sometimes carried by a human body and its fingertip, which may be in the range of several kilo volts (kV) or more, may be sufficiently high to break through the solid state cell's upper dielectric/passivation layer. If this breakthrough occurs, the potential is raised at ungrounded circuit nodes that are associated with the buried capacitor plates and may cause damage to the associated array cell. Damage to the data or the sensor must be avoided, while the sensitivity of the sensor is maintained at close to optimal levels.

Another significant problem of the current structures for the protection of fingerprint sensors is contamination from substances, such as oils and proteins, that are found on the surface of fingers. To remove these contaminants, organic or inorganic solvents or detergents are often used to clean the sensor surface. Therefore, the electrostatic discharge protection must be resistant to these often corrosive compounds.

Another area of concern is hygiene. Fingers, as well as the environment, tend to contain microbes that are removed from the sensor along with contaminants. To remove these microbes and contaminants and reduce the chance of contagion between users, antibacterial, antifungal and decontaminating agents are often used to clean the sensors. These decontaminating agents often include harsh abrasives, enzymes, organic or inorganic solvents or detergents. Furthermore, the sensors are often exposed to oxidating environments, UV rays, and the like during normal use. Therefore, any electrostatic discharge protection must be resistant to corrosive cleaning compounds and other environmental agents that may damage the sensor.

What is needed is a structure and method to protect sensors from electrostatic discharges, while at the same time maintaining the sensors ability to withstand mechanical stress. The structure must not only permit continued functioning of the sensor during normal use, but also withstand, among others, the extreme conditions of humidity, electricity, heat, light, etc., to which the sensor may be exposed. The sensor electrostatic discharge structure should also be resistant to chemical detergents and solvents, but still be compatible with the underlying components of the sensor.

SUMMARY OF THE INVENTION

The present invention provides a method of, and system for, providing electrostatic discharge capability for a sensor circuit, such as a fingerprint sensor. In a type of sensor array with which this invention finds utility, each sensing cell includes ungrounded metal capacitor plates covered by a dielectric. An ungrounded object, such as a fingertip that comes close to, or in contact with, the dielectric forms a third capacitor plate between the metal capacitor plates. An electrostatic charge sometimes carried by a human body may be sufficiently high to break through the dielectric layer covering the metal capacitor plates. The present invention improves the electrostatic discharge performance of such a sensor array.

The present invention is directed to a process and apparatus for dissipating electrostatic charges including, an insulating layer between and over first and second conductive plates, wherein the insulating layer isolates the conductive plates and protects the conductive plates from damage. The insulating layer will generally be a dielectric layer. A conductive electrostatic discharge path is disposed over at least a portion of the dielectric layer and disposed adjacent to or over at least a portion of the conductive plates.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 4 is a top view of another embodiment of a basic structure for electrostatic discharge protection according to the present invention;

FIG. 5 is a top view of yet another embodiment of a basic structure for electrostatic discharge protection according to the present invention;

FIG. 6 is a top view of yet another embodiment of a basic structure for electrostatic discharge protection according to the present invention with an opening;

FIG. 7 is a top view of yet another embodiment for a basic structure for electrostatic discharge protection according to the present invention also having an opening; and FIG. 8 is a top view of yet another embodiment of a basic structure for electrostatic discharge protection according to the present invention also with an opening.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of ways to make and use the invention and do not delimit the scope of the invention.

Figure 1:
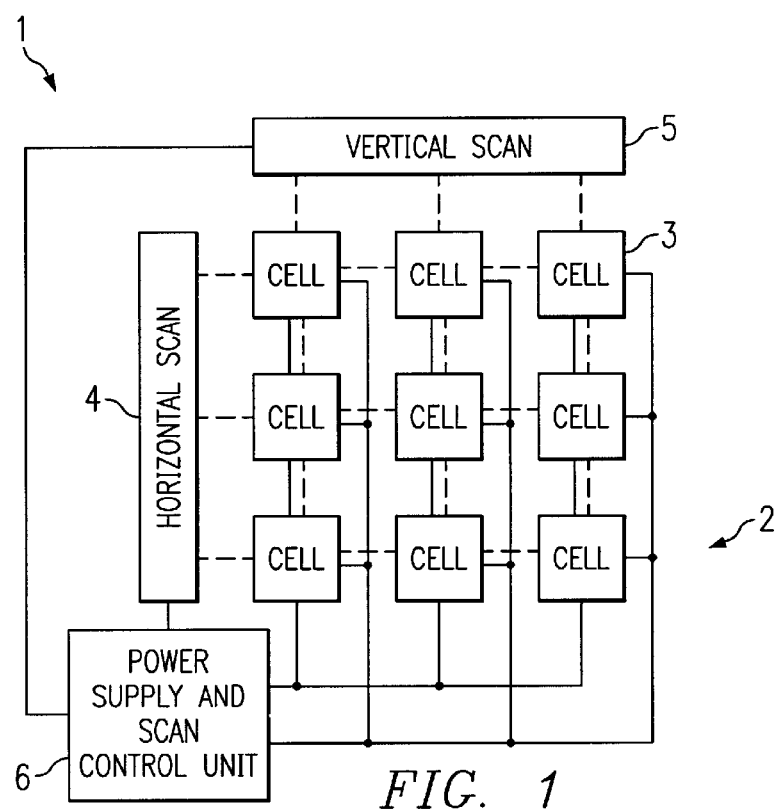
FIG. 1 is a block diagram of a sensor array according to the present invention.

By way of background, referring now to FIG. 1, there is shown a block diagram of a user input device 1. User input device 1 is preferably integrated into a single chip, and it includes an array 2 of sensors or pixel cells 3. For purposes of illustration, array 2 is shown comprising nine cells 3. In an actual device, more than nine cells would more likely be included. Each individual sensing cell 3 represents one pixel of the array 2 and is generally smaller than the width of a fingerprint ridge. Enough cells 3 are included in array 2 so that several ridges and valleys of a fingerprint may be detected. In a preferred embodiment, pixel cells 3 are on a pitch of approximately 50 μm, which corresponds to a resolution of approximately 508 dots per inch (dpi) for a fingerprint image.

Device 1 includes a horizontal scanning stage 4 and a vertical scanning stage 5. Scanning stages 4 and 5 enable detection from one cell in array 2 at a time according to a predetermined scanning pattern.

Input sensor device 1 includes a power supply and scan control unit 6. Power supply and scan control unit 6 supplies a reference voltage to each cell 3 of array 2. Power supply and scan control unit 6 also operates to scan stages 4 and 5 to produce the desired scanning of cells 3.

Figure 2:
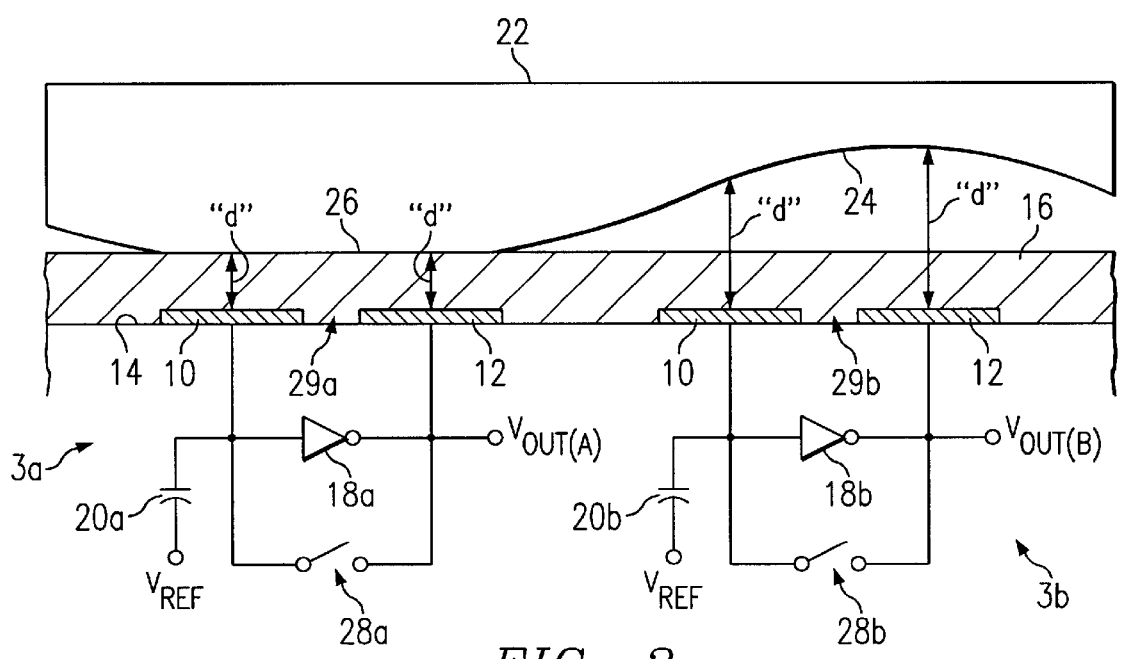
FIG. 2 illustrates the physical structure of the individual sensor cells and their electrical operation according to the present invention.

By way of further background, referring now to FIG. 2, there is illustrated the structure and operation of a cell 3. The preferred cell of the present invention is of the type disclosed in Tartagni, U.S. patent application Ser. No. 08/799,543, filed Feb. 13, 1997, titled CAPACITIVE DISTANCE SENSOR, the disclosure of which is incorporated herein by reference. The technology of the present invention uses an active pixel design based on a capacitive feedback sensing circuit.

Each cell 3 (3a, 3b) includes a first conductor plate 10 and a second conductor plate 12 supported on a semiconductor substrate, which is preferably a conventional silicon substrate that may have a shallow epitaxial layer at an upper surface region 14 of the silicon substrate. The top surface of the substrate includes an insulating layer 16. Insulating layer 16 is preferably an oxide layer, which may be a conventional thermally deposited silicon dioxide layer. Insulating layer 16 may further comprise a protective or passivation coating preferably of a hard or ultra-hard material. With an added protective coating, insulating layer 16 protects sensor 3 from abrasion, contamination, and electrostatic discharge.

Each cell 3 includes a high-gain inverting amplifier 18 (18a, 18b). The input of amplifier 18 is connected to a reference voltage source $V_{ref}$ through an input capacitor 20 (20a, 20b). The output of each amplifier 18 is connected to an output $V_{out}$ ($V_{outa}$, $V_{outb}$). The input of each amplifier 18 is also connected to the respective conductor plate 10 and the output of each amplifier 18 is also connected to the respective conductor plate 12, thereby creating a charge integrator whose feedback capacitance is the effective capacitance between the two conductor plates 10 and 12.

When no object is placed on the surface of insulating layer 16, the effective capacitance between plates 10 and 12 is the fringing capacitance seen through layer 16 and the air near the surface of the sensor at region 29 (29a, 29b). The distance between plates 10 and 12 at region 29 is approximately 2 microns. When an object 22, such as a finger, is placed on the surface of insulating layer 16, the conductive properties of the object (e.g., skin surface) and the proximity of the object to the sensor surface will act to modify the capacitance coupling between plates 10 and 12. The object is separated from plates 10 and 12 by a total dielectric layer that includes both the insulating layer 16 and a variable thickness of air between layer 16 and the object. Because fingerprint valleys or pores 24 will be farther from the sensor surface than finger ridges 26, sensors 3 beneath valleys or pores 24 will have more distance between their conductor plates 10 and 12 and the skin surface than sensors 3 under ridges 26. The thickness "d" of this total dielectric layer will modulate the capacitance coupling between plates 10 and 12 of each cell 3. Accordingly, sensors 3 under valleys or pores 24 will exhibit a different effective capacitance than sensors 3 under ridges 26. As shown in FIG. 2, the effective capacitance of sensor 3a is different from the effective capacitance of sensor 3b. $V_{OUTA}$ will differ from $V_{OUTB}$ since $V_{OUT}$ is inversely proportional to the effective feedback capacitance.

Scanning stages 4 and 5 of FIG. 1 now operate to sequentially enable the reading or interrogation of the many cells 3 within array 2. Sensors 3 work in two phases. During the first phase, the amplifier 18 is reset with a switch 28 (28a, 28b) by shorting the input and output of amplifier 18. This causes amplifier 18 to settle at its logical threshold. During the second phase, a fixed charge is input to the amplifier, causing an output voltage swing inversely proportional to the feedback capacitance, which is the effective capacitance between conductor plates 10 and 12. This effective feedback capacitance is now the capacitance between plates 10 and 12 seen across the total dielectric at a distance "d" which includes layer 16 and air between the finger 22 and the top of layer 16.

For a fixed amount of input charge, the output of amplifier 18 will range between two extremes depending on the effective feedback capacitance value. The first extreme is a saturated voltage level if the effective feedback capacitance is very small. The second extreme is a voltage close to the logical threshold, which is the reset value, when the effective feedback capacitance is large. Since the distance between the skin and the sensor changes the effective feedback capacitance of the charge integrator, the output of sensor 3a under ridge 26 will be different from the output of sensor 3b under valley 24. The entire fingerprint pattern can thus be digitized by sensing the differences in adjacent pixel cell capacitive values. It is also important to note that a conductive path to ground should be provided to or around each pixel (not shown), such that an electrostatic discharge is dissipated though the conductive path to ground rather than through the circuitry of the pixel and to ground. To be effective, such electrostatic discharge layer must present a more conductive path to ground than any paths to ground through the internal circuitry of the pixels and any dielectrics insulating the circuitry from the environment.

The structure and method of the present invention may be used with a wide variety of imaging sensors, such as the fingerprint sensor described herein by way of example, and as will be known to those skilled in the art in light of the present disclosure.

As noted above, in using the described capacitance-coupled sensor, resolutions of up to 508 dpi can be achieved-.With improvements in image processing algorithms, sensors having a resolution of 750 dpi, or more, can be expected. For use in sensing fingerprint valleys and ridges, an array 2 of sensors 3 is used to sample the fingerprint pattern. The entire chip may also contain additional timing and voltage controls and references in addition to the above described controls and references.

The structure and method for dissipating the electrostatic discharge and protecting the pixel cell 3 will now be described. Electrostatic discharge protection relative to electrostatic potential that may be carried by an object such as an ungrounded fingertip, is provided by placing a number of conductive paths within the insulating layer 16. Each pixel cell 3, such as a capacitively coupled fingerprint sensor, is formed on a silicon substrate. The substrate may have P-type or N-type conductivity. The substrate may be made of, for example, silicon, glass, gallium arsenide, silicon on insulator (SOI) structures, epitaxial formations, germanium, germanium silicon, polysilicon, amorphous silicon, or like semi-conductive or conductive substrates. The substrate is typically made of single crystal silicon, and may be lightly doped with boron, phosphorous or arsenic atoms depending upon the desired conductivity.

Figure 3:
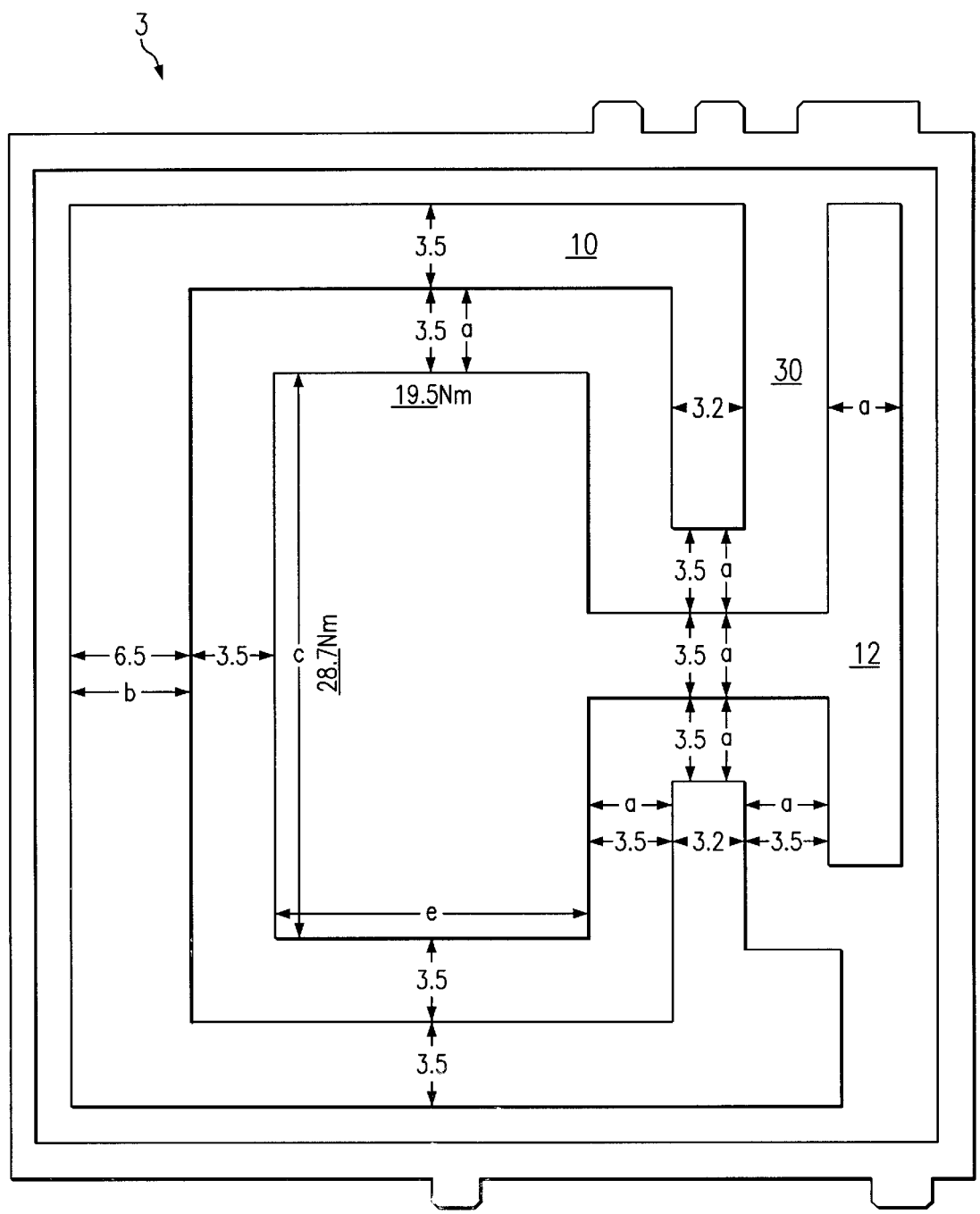
FIG. 3 is a top view of one embodiment of a basic structure for electrostatic discharge protection according to the present invention.

Referring to FIG. 3 a top view of the plates 10 and 12 of a single capacitively-coupled sensor cell 3 are depicted. As will be apparent to those of ordinary skill in the art the selection as an input or output plate does not generally affect sensor sensitivity. In one particular embodiment the plates 10, 12 have about the same surface area. The inner plate 12 serves as one half of one electrode of the sensor 3 and the outer plate 10 as the complementary half of the same capacitor electrode that interacts with an object 22, such as a finger, as the opposed capacitor electrode. A gap 30 separates the plates 10, 12. The gap 30 between the plates 10, 12 is the distance "a", which in one embodiment is 3.5 $\mu$M. The central portion of plate 12 is depicted as a rectangle, having a length "c", which may be, e.g., 28.7 $\mu$M, and a width "e" having a length of, e.g., 19.5 $\mu$M. The first plate 10 generally has features with a width of "a", but along one edge is depicted with a width "b", which may have a dimension of, e.g., 6.5 $\mu$M.

The electrical center of the sensor 3 is slightly off-center of the plate 12 due to the shape of the plates 10 and 12, and is generally the point or area over which the electrical detection center of the overall capacitor electrode is found. For example, if the plates 10, 12 form a square within a square, then the electrical center of the sensor 3 is at the center of the two squares. Likewise, the electrical centers of circular, oblong, rectangular, polygonal or asymmetric sensors may also be calculated. Likewise, the individual features of the plates, e.g., the line widths, may be varied within the sensor 3, as is depicted in FIG. 3.

FIG. 4 is a top view of a structure for dissipating electrostatic discharges and protecting a pixel cell 3. A dielectric is disposed between the plates 10 and 12 and a discharge path or pad 40, which is disposed above the plane of the plates 10 and 12 of cell 3. Referring to FIG. 2, the plates 10 and 12 are in generally the same plane, while the discharge pad 40 depicted in FIG. 4 is on a different plane, generally closer to the user than the underlying electronic circuitry. The discharge pad 40 may be conductive or semi-electrical conductive depending on the level and extent of electrostatic discharge to which a sensor 3 or a sensor array 2 system may be exposed. The discharge pad 40 will provide a more conductive path to ground than the internal circuitry of the pixels or any dielectric disposed therebetween.

The conductivity of the discharge pad 40, however, must also be sufficient to transfer electrostatic discharges created at the surface of the sensor cell 3 at discharge pad 40 and the insulating layer 16 (referring to FIG. 2), to protect the electronic components of the sensor cell 3. The sensor protection depicted in FIG. 4 is a discharge pad 40 that forms a cross-shaped path over the sensor plates 10 and 12, and is surrounded by a rectangular path to ground. Discharge pad 40 thereby covers a greater portion of the surface area of the inner plate 10 than that covered on the outer plate 12. Mostly uncovered in this configuration is the gap 30 between the plates 10 and 12. The conductive paths that form the discharge pad 40 depicted, may be formed on, or integral with, the insulating layer 16 (see FIG. 2). The conductive paths may be formed independently or at the same time as the insulting layer 16.

The insulating layer 16 may be a dielectric layer formed over conductor plates 10 and 12 and the upper region 14 of a substrate, preferably by deposition techniques using plasma enhanced chemical vapor deposition (PECVD) to a thickness that will electrically isolate subsequent layers from conductor plates 10 and 12 and substrate 13. The dielectric layer may be formed of any suitable dielectric material and thickness that ensures electrical isolation, for example, silicon dioxide or glass. The glass may contain, e.g., phosphorous or boron and phosphorous, which may serve to trap sodium ions from objects, such as the skin. The thickness of dielectric layer may be varied, for example, by changing the time of deposition. The dielectric may preferably be between about 6,000 and 12,000 angstroms. Alternatively, dielectric layer may be a composite layer having a first and second dielectric layers formed of compatible dielectric materials with desired dielectric constants. If a composite dielectric layer is formed one layer is preferably silicon dioxide or glass and the other layer is preferably silicon nitride. Each of these layers may have a thickness between approximately 3,000 and 6,000 angstroms.

A passivation layer may be formed, if desired, over integral with or adjacent to the conductive paths of the electrostatic discharge system and over exposed insulating 16, and may also be deposited by, e.g., PECVD. The passivation layer may be, e.g., a hard material suitable for protecting the sensor surface, such as silicon carbide or a combination of silicon carbide and silicon nitride. This overlying passivation layer, if formed, should be thick enough to protect the sensor from abrasion and contamination yet thin enough to allow the discharge grid 40 to transfer the electrostatic discharge created at the surface of layer 16 away from the active circuits of cells 3 of array 2. In a preferred embodiment, the passivation layer is between approximately 2,000 and 3,000 angstroms.

The discharge pad 40 may be further coupled to a charge dissipation circuit (not shown), providing a conductive path to ground that is more conductive than any path(s) to ground through the internal circuitry of the pixels and any dielectrics insulating the circuitry from the environment. While the insulating layer 16 is shown in FIG. 2 as a conformal layer, it may also be etched back to form a substantially planar layer or may be formed from a material that is generally planar when formed, such as a spin-on-glass.

The discharge pad 40 may also provides durability to the underlying sensor, and more particularly, to the entire insulating layer 16. The thickness, composition and location of discharge pad 40 may be varied to optimize its ability to carry the electrostatic discharge away from sensor 3 while minimizing the effect on the sensitivity of sensor 3 caused by placing discharge pad 40 between the capacitance source, e.g., a finger, and the conductor plates 10 and 12.

The thickness of the discharge pad 40 may be between approximately 500 and 15,000 angstroms depending upon the desired material. The thickness of the discharge pad 40 may also be increased or decreased depending on, e.g., the desired ratio of the dielectric material to conductive material in insulating layer 16, desired resistivity levels, shape and size of the discharge pad 40, the insulating layer 16 and the like. The composition of discharge pad 40 may be formed from any suitable material for charge carrying capacity and for additional damage protection. For example, aluminum or an aluminum alloy may be formed to a thickness between approximately 5,000 and 15,000 angstroms having a resistivity of approximately 0.04 ohms per square. Alternatively, a titanium layer may be formed to a thickness between approximately 500 and 1,000 angstroms with a resistivity of approximately 10 ohms per square. Alternatively, a tungsten layer may be formed to a thickness of between approximately 4,000 and 8,000 angstroms having a resistivity of approximately 0.14 ohms per square.

The conductive material chosen should have a sheet resistance low enough to allow the electrostatic charge to dissipate through the discharge pad 40 thereby preventing the electrostatic charge from reaching conductor plates 10 and 12. The materials used for the discharge pad 40 should be chosen to minimize adhesion problems between the layers, which could detrimentally affect the underlying sensor performance.

The discharge pad 40 may be deposited using the same equipment that is presently used to create the insulating layer 16 for use with, e.g., a fingerprint sensor. Thus, the present invention presents additional advantages in cost and efficiency in manufacturing. By using the current PECVD equipment, the entire layer 16 may be deposited at relatively low temperatures, e.g., 300 degrees Celsius or less.

In one embodiment for forming discharge pad 40, by way of example, a titanium layer is initially blanket deposited followed by forming titanium nitride over the titanium. Next, tungsten is formed over the titanium nitride to form a composite discharge pad 40.

FIG. 5 is a top view of a discharge pad 40 formed in a generally symmetrical pattern over the electrical center of the plates 10 and 12 of the sensor cell 3. In the discharge pad 40 depicted in FIG. 5, the inner plate 10 is separated by the insulating layer 16 from a conductive rectangle 42 that is centered over a portion of the inner plate 12, adjacent the gap 30. A portion of the inner plate 12 is generally not covered by the conductive rectangle 42. The conductive rectangle 42 is connected to the rest of the discharge pad 40 through a conductive line 44. The width of the conductive line 44, may be more or less than the width of the line of the plate 12. In this embodiment, the discharge pad 40 does not cross over the gap 30 between the plates 10, 12. While a rectangle is depicted, the discharge pad 40 may be formed or patterned in any shape as long as it covers at least a portion of one plate 10 or 12 of the sensor cell 3.

FIG. 6 is a top view of a generally symmetric discharge pad 40 that combines the features of the discharge pads 40 depicted in FIGS. 4 and 5. The combination of the conductive cross-shaped discharge pad 40 and the conductive rectangle 42 combines the electrostatic discharge capabilities of the cross-shaped and central rectangle discharge pads 40. It will generally be observed that the sensitivity of a sensor cell 3 will be most affected by covering a greater surface area over the plates 10, 12. Therefore, the least effect on sensitivity is expected for the cross-shaped discharge pad 40 of FIG. 4, followed by the rectangular pad of FIG. 5 and finally the combination cross-shaped and rectangular pad of FIG. 6 experiencing the most effect on sensitivity. The choice for protection will vary depending on the expected use, the sensitivity, the likelihood of exposure to an electrostatic discharge and other environmental conditions. For example, the discharge and abrasion protection afforded by the discharge pad 40 depicted in FIG. 6 may be preferred when expecting high sensor use, widely varying environmental conditions (e.g., for use outdoors), and sensor sensitivity is not sufficiently affected. Conversely, a cross-shaped discharge pad 40 would be preferred for high sensitivity sensors used in controlled conditions, e.g., indoors, under controlled temperature and with low sensor use.

FIG. 7 is a top view of a generally symmetric discharge pad 40 having a dual level central conductive rectangle. To obtain the dual level conductive rectangle 46, an opening 36 is formed in the discharge pad 40 following deposition. As in the previous examples, the conductive discharge pad 40 does not come in contact with the inner and outer plates (not depicted) as the insulating layer 16 (see FIG. 2) is not completely breached by the opening 36. Therefore, the insulating layer 16 maintains electrical isolation between the discharge pad 40 and the sensor plates 10 and 12.

FIG. 8 is a top view of a generally symmetric discharge pad 40 having an opening 36 as depicted in FIG. 7, but also including the cross-shaped features depicted in FIGS. 4 and 6. The underlying the plates are not depicted. As with the discharge pad 40 depicted in FIG. 7, the sensor sensitivity is expected to increase by protecting or covering less of the underlying plates with the discharge pad 40. Conversely, the amount of discharge protection is likely to decrease due to the decrease in total area of the conductive discharge pad 40.

The discharge pad 40 may be connected to a grounding circuit or other source of ground, including, but not limited to, the sensor ground or a separate discharge pad ground. Grounding may even occur with the power supply ground, a ground attached to the overall sensor chassis or a separate ground.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A portion of an integrated circuit, comprising:
   a plurality of conductive plates arranged within a single layer in pairs of capacitive sensing electrodes;
   an insulating layer between and over the plurality of conductive plates, wherein an upper surface of the insulating layer serves as a contact surface for a finger having a fingerprint pattern to be detected, wherein the finger forms a capacitor with each pair of capacitive sensing electrodes when placed on the contact surface; and
   a conductive electrostatic discharge pad disposed within the insulating layer over at least a portion of at least one capacitive sensing electrode within each pair of capacitive sensing electrodes and between the portion of the at least one capacitive sensing electrode and the contact surface.

2. The integrated circuit of claim 1, wherein the insulating layer further comprises a passivation layer to further protect the conductive plates from damage.

3. A portion of an integrated circuit, comprising:
   a plurality of conductive plates arranged within a single layer in pairs of capacitive sensing electrodes, each pair of capacitive sensing electrodes forming a pixel sensing element;
   a protective layer including a dielectric material over and between the plurality of conductive plates, the protective layer electrically isolating the conductive plates, an upper surface of the protective layer serving as a contact surface for a finger forming a capacitor with each pair of capacitive sensing electrodes when a portion of the finger is placed on the contact surface; and
   a conductive path disposed within the protective layer separated from the conductive plates by a portion of the dielectric material and disposed over at least a portion of at least one capacitive sensing electrode within each pair of capacitive sensing electrodes and between the portion of the at least one capacitive sensing electrode and the contact surface, wherein the conductive path dissipates an electrostatic charge in a manner that prevents the electrostatic charge from reaching the plurality of conductive plates.

4. The integrated circuit of claim 3, wherein each pair of capacitive sensing electrodes includes a central rectangular electrode and an outer loop electrode around a portion of a periphery of the central rectangular electrode, and wherein the conductive path includes a central rectangle disposed over a portion of the central rectangular electrode, the conductive path being connected by a conductive line to ground.

5. The integrated circuit of claim 4, wherein the conductive path includes an open rectangle surrounding the central rectangle and connected by a conductive line to ground.

6. The integrated circuit of claim 4, wherein the conductive path includes a closed rectangle for the central rectangle, an open outer rectangle surrounding the central rectangle, and a cross connecting the central rectangle to the open outer rectangle, all connected by a conductive line to ground.

7. The integrated circuit of claim 4, wherein the conductive path includes a closed rectangle for the central rectangle, an open rectangle surrounding the central rectangle, and a cross connecting the central rectangle to the open outer rectangle.

8. The integrated circuit of claim 4, wherein the conductive path includes an open rectangle for the central rectangle, an open outer rectangle surrounding the central rectangle, and a cross connecting the central rectangle to the open outer rectangle.

9. The integrated circuit of claim 4, wherein the protective layer further comprises:

a passivation layer disposed over at least a portion of the dielectric material.

10. The integrated circuit of claim 9, wherein the conductive path is disposed over the dielectric material, and wherein the passivation layer is disposed over the conductive path.

11. The integrated circuit of claim 9, wherein a portion of the conductive path is disposed over a prtion of the dielectric material adjacent to the conductive plates.

12. The integrated circuit of claim 9, wherein the conductive path is disposed over a portion of the dielectric material over the conductive plates, and wherein the passivation layer is disposed on the conductive path and on a portion of the dielectric material not covered by the conductive path.

13. The integrated circuit of claim 9, wherein the passivation layer is disposed over the dielectric material and the conductive plates, and wherein the conductive path is disposed over the dielectric material substantially over all of one of the conductive plates.

14. The integrated circuit of claim 9, wherein the conductive path and passivation layer are substantially planar.

15. The integrated circuit of claim 3, wherein each pair of capacitive sensing electrodes includes a central rectangular electrode and an outer loop electrode around a portion of a peripheray of the central rectangular electrode, and wherein the conductive path is generally cross-shaped and overlies at least a portion of both the central rectangular electrode and the outer loop electrode.

16. A portion of an integrated circuit for capacitively sensing a fingerprint pattern on a finger, comprising:

an array of pairs of capacitive sensing electrodes formed within a single layer and employed for sensing the fingerprint pattern, each pair of capacitive sensing electrodes comprising:

an inner conductive plate forming a central portion; and an outer conductive plate forming a loop around substantially all of a periphery of the central portion, the inner and outer conductive plates separated by a gap, wherein each pair of capacitive sensing electrodes forms a single capacitor with a portion of a finger when the finger is placed in proximity to the conductive plates;

a protective layer including an insulating material between and over the conductive plates; and a conductive electrostatic discharge pad disposed within the protective layer and overlying at least a portion of at least one conductive plate within said each pair of capacitive sensing electrodes, the discharge pad separated from the conductive plates by a portion of the insulating material.

17. The portion of an integrated circuit as set forth in claim 16, wherein the conductive electrostatic discharge pad further comprises:

a rectangular portion having an opening therethrough within a central region overlying the conductive plates; and a cross portion within the central region, each arm of the cross portion connected opposite sides of the rectangular portion.

18. The portion of an integrated circuit as set forth in claim 16, wherein the conductive electrostatic discharge pad further comprises:

a first rectangular portion having an opening therethrough within a central region overlying the conductive plates;

a second rectangular portion within the central region and overlying the inner conductive plate; and a conductive line connecting the first and second rectangular portions.

19. The portion of an integrated circuit as set forth in claim 16, wherein the conductive electrostatic discharge pad further comprises:

a first rectangular portion having an opening therethrough within a central region overlying the conductive plates;

a second rectangular portion within the central region and overlying the inner conductive plate; and a cross protion within the central region, each arm of the cross portion connecting the first and second rectangular portions.

20. The portion of an integrated circuit as set forth in claim 16, wherein the conductive electrostatic discharge pad does not overlie the gap between the inner and outer conductive plates.

* * * * *

UNITED STATES PATENT AND TRADEMARK OFFICE
CERTIFICATE OF CORRECTION

PATENT NO. : 6,346,739 B1
DATED : February 12, 2002
INVENTOR(S) : Arnaud Yves Lepert and Frederic Denis Raynal Page 1 of 1

It is certified that error appears in the above-identified patent and that said Letters Patent is hereby corrected as shown below:

Column 7,
Lines 56, after "over" insert -- , --.
Line 57, after "with" insert -- , --.
Line 58, after "insulating" insert -- layer --.

Column 8,
Lines 31-32, delete "resistivity" and insert -- sheet resistance --.
Line 34, delete "resistivity" and insert -- sheet resistance --.
Line 38, delete "resistivity" and insert -- sheet resistance --.

Signed and Sealed this

Fourteenth Day of May, 2002

*Attest:*

JAMES E. ROGAN
*Attesting Officer*  *Director of the United States Patent and Trademark Office*